United States Patent [19]

Sorensen

[11] Patent Number: 4,465,804

[45] Date of Patent: Aug. 14, 1984

[54] MULTICOMPONENT THERMOPLASTIC POLYMER BLENDS

[75] Inventor: Ian W. Sorensen, Bloomfield Hills, Mich.

[73] Assignee: Allied Corporation, Southfield, Mich.

[21] Appl. No.: 576,070

[22] Filed: Feb. 2, 1984

Related U.S. Application Data

[63] Continuation-in-part of Ser. No. 411,922, Jun. 28, 1982.

[51] Int. Cl.$^3$ .................... C08L 53/00; C08L 75/00; C08L 67/00; C08J 3/20

[52] U.S. Cl. .................................. 524/505; 523/351; 524/507; 524/512; 524/513; 524/514; 524/524; 524/530; 525/903

[58] Field of Search ............... 524/505, 507, 512, 513, 524/514, 524, 530; 523/351, 333; 525/903

[56] References Cited

U.S. PATENT DOCUMENTS

| | | | |
|---|---|---|---|
| 3,393,174 | 7/1968 | Potter et al. | 260/41 |
| 3,422,056 | 1/1969 | Carton | 523/351 |
| 3,431,224 | 3/1969 | Goldblum | 524/590 |
| 3,437,631 | 4/1969 | Cleveland | 524/508 |
| 3,629,154 | 12/1971 | Johnson | 252/511 |
| 3,660,347 | 5/1972 | Wendler et al. | 117/8 |
| 3,742,088 | 6/1973 | Holder et al. | 525/185 |
| 3,816,373 | 6/1974 | Hoogeboom | 528/204 |
| 3,932,323 | 1/1976 | Perry | 523/351 |
| 3,933,730 | 1/1976 | Hoogeboom | 524/537 |
| 3,976,618 | 8/1976 | Takida et al. | 260/40 |
| 4,088,626 | 5/1978 | Gergen et al. | 260/42.18 |
| 4,088,627 | 5/1978 | Gergen et al. | 524/505 |
| 4,102,854 | 7/1978 | Gergen et al. | 524/505 |
| 4,111,875 | 9/1978 | Uva | 260/23 R |
| 4,117,894 | 9/1978 | Gergen et al. | 524/505 |
| 4,161,419 | 7/1979 | Alia | 523/351 |
| 4,201,704 | 5/1980 | Cohen et al. | 524/537 |
| 4,243,575 | 1/1981 | Myers et al. | 525/148 |
| 4,263,196 | 4/1981 | Schumacher et al. | 260/33.6 |
| 4,280,948 | 7/1981 | Dieck | 524/537 |
| 4,281,084 | 7/1981 | Fellmann et al. | 525/309 |
| 4,302,553 | 11/1981 | Frisch et al. | 525/903 |
| 4,335,032 | 6/1982 | Rosenquist | 524/508 |
| 4,338,227 | 6/1982 | Ballard | 524/143 |

FOREIGN PATENT DOCUMENTS 705481  3/1965  Canada .............................. 524/508

OTHER PUBLICATIONS

J. L. White, "Rheological Behavior of Highly Filled/Reinforced Polymer Melts", *Plastics Compounding*, Jan./Feb., 1982.

R. S. Ziegelbaur & J. M. Caruthers, "Rheological Properties of Dispersions of Fumed Silica in Polydimethylsiloxane", 53rd. Annual Meeting of the Society of Rheology, Louisville, Kentucky, Oct. 1981.

Chem. Abs., 97-73199j (1982), Viorica et al.

Chem. Abs., 72-13285h (1970), Bauwens et al.

*Primary Examiner*—Herbert J. Lilling

*Attorney, Agent, or Firm*—James R. Ignatowski; Russel C. Wells

[57] ABSTRACT

The invention is a multicomponent thermoplastic interpenetrating polymer network blend having a particulate loaded homopolymer as the network stabilizing phase.

16 Claims, 3 Drawing Figures

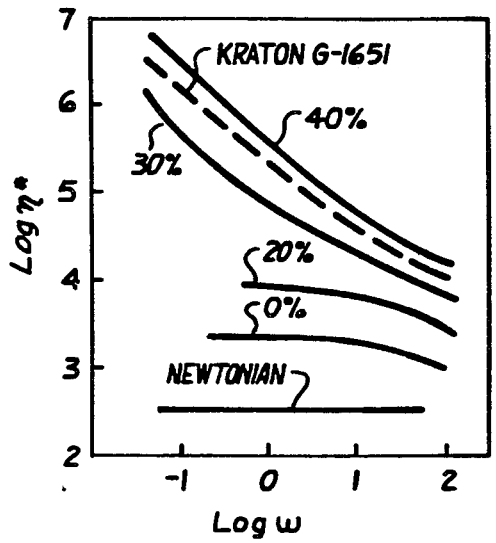
Fig-1
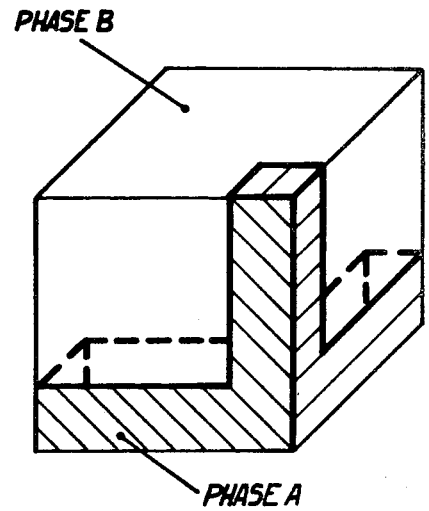
Fig-2
Fig-3
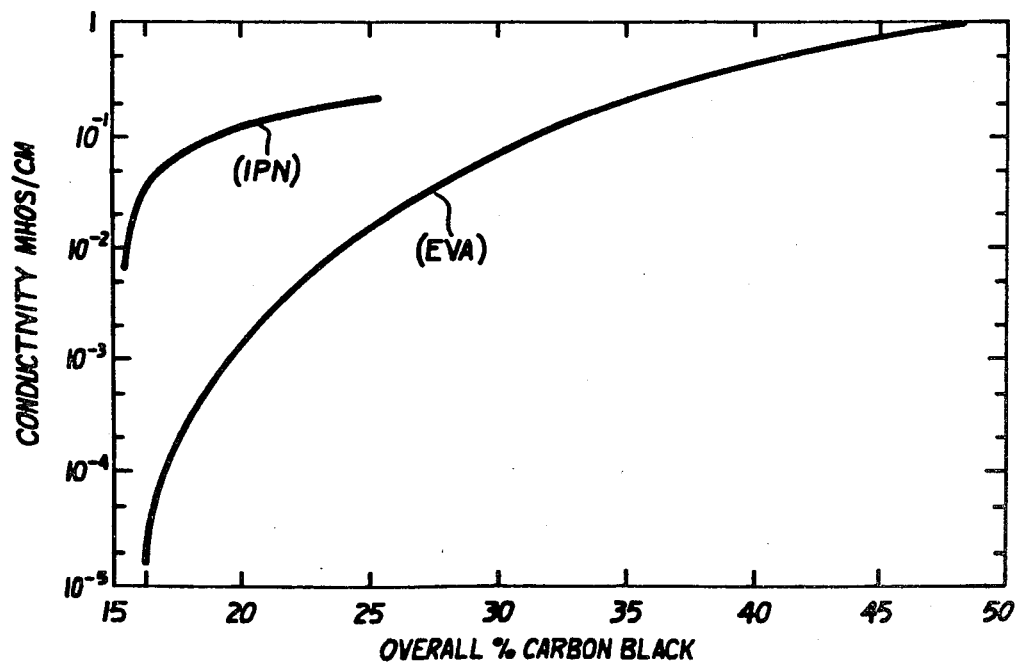

MULTICOMPONENT THERMOPLASTIC POLYMER BLENDS

CROSS REFERENCE

This application is a continuation-in-part, and contains subject matter disclosed in the Applicant's copending application Ser. No. 411,922 filed June 28, 1982.

BACKGROUND OF THE INVENTION

1 Field of the Invention

The invention is related to multicomponent thermoplastic interpenetrating polymer network blends and in particular the use of polymers loaded with suspended particulates as the structure stabilizing phase.

2 Prior Art

Thermoplastic interpenetrating polymer networks (TIPN's) have been developed as is evidenced by U.S. Pat. No. 4,088,626 "Multicomponent Polysulfone-Block Copolymer-Polymer Blends" issued to Gergen et al, May 9, 1978 and U.S. Pat. No. 4,338,227 "Ethylene Copolymer Blends and Adhesives Based Thereon" issued to E. C. Ballard July 6, 1982. Gergen et al discloses a multicomponent polymer blend composition comprising an intimately mixed polysulfone, a selectively hydrogenated monoalkenyl arene-diene block copolymer and at least one dissimilar engineering themoplastic resin. The Non-Newtonian flow behavior of block copolymer permits the blend composition to be stress blended at an elevated temperature to form at least one partial continuous network phase which interlocks with the other polymers. This results in a desired balance of properties of the resultant copolymer-polymer blend. Ballard discloses homogeneous blends of at least two cross-linked ethylene copolymers.

Johnson, in U.S. Pat. No. 3,629,154 discloses a method for making thin, electrically conductive nonporous dispersed phase polymeric film. The essential ingredient of the dispersed phase polymeric film is an ethylene-vinyl acetate copolymer highly loaded with a conductive powder. For processing thin films, polyisobutylene is added to the loaded ethylene-vinyl acetate copolymer to reduce its viscosity.

Takida et al in U.S. Pat. No. 3,976,618 discloses a method for making dispersed phase plastic moldings having improved heat deflection characteristics in which large amounts of talc are dispersed in a hydrolyzed ethylene-vinyl acetate copolymer.

In summary the prior art teaches the use of block copolymers as the network structure stabilizing phase in thermoplastic interpenetrating polymer networks (TIPN's). Specifically, the prior art discloses the use of only a hydrogenated monoalkenyl arene-diene block polymer as the structure stabilizing phase.

Materials, other than the hydrogenated monoalkenyl arene-diene block-copolymers disclosed by the prior art, are known to exhibit Non-Newtonian rheological behavior as required for network structure stabilizing phase of thermoplastic interpenetrating polymer networks. R. S. Ziegebaur, and J. M. Caruther in their paper "Rheological Properties of Dispersions of Fused Silica in Polydimethysilorane" presented at the 53rd Annual Meeting of the Society of Rheology, Louisville Kentucky, October, 1981 disclosed various other homopolymer materials containing dispersed particulates which exhibit the desired Non-Newtonian properties. Additionally James L. White in his article "Rheological Behavior of Highly Filled/Reinforced Polymer Melts, Plastic Compounds January/February 1982" discusses the Non-Newtonian behavior of polymers loaded with particulates.

SUMMARY

The invention is a thermoplastic interpenetrating polymer network blend having a homopolymer loaded with a particulate as the structure stabilizing phase. A homopolymer which initially has Newtonian rheological behavior at low shearing frequencies is loaded with a predetermined quanitty of a suitable particulate to produce a rheological behavior corresponding to the Non-Newtonian behavior of a hydrogenated monoalkenyl arene-diene block copolymer. The loaded homopolymer is then shear mixed with at least one dissimilar engineering thermoplastic resin to form at least one partially continuous network interlocked with the other polymer networks. For example a silicone oil or ethylene vinyl acetate loaded with 30 to 40 percent by weight with carbon block exhibits approximately the same rheological behavior as the block copolymers used as the structure stabilizing phase of the prior art thermo-plastic interpenetrating polymer networks. The advantage of the invention is that homopolymers may be used as the structure stabilizing phase of the thermoplastic interpenetrating polymer network permitting a wider selection of materials that can be used to form the blend. This and other advantages of the invention will become more apparent from reading the detailed description of the invention.

BRIEF DESCRIPTION OF THE DRAWINGS

FIG. 1 is a graph showing the Non-Newtonian rheological behavior of silicone oil loaded with carbon black compared to that of one of the family of block copolymer described by Gergen et al.

FIG. 2 is a three dimensional model of an idealized interpenetrating polymer network.

FIG. 3 is a graph showing the electrical conductivity of a dispersed phase ethylene vinyl acetate polymer as a function of carbon black loading compared to the electrical conductivity of an interpenetrating polymer network embodying a dispersed phase ethylene vinyl acetate polymer as the structure stabilizing phase.

DETAILED DISCRIPTION OF THE INVENTION

Thermoplastic interpenetrating polymer networks such as disclosed by Gergen et al in U.S. Pat. No. 4,088,626 utilize the rheological behavior of a selectively hydrogenated monoaklenyl arene-diene block copolymer as the stabilizing phase of the structure's network. The key to the formation of the desired network is the Non-Newtonian behavior of the cited block copolymer which exhibits a "yield stress" in the melt. Below the critical shear stress, the material behaves like an elastic solid, while above the critical shear stress a Non-Newtonian flow occurs. Hence the block copolymer retains its shape when stress is removed. Therefore when the mixing of the thermoplastic alloy containing such a block copolymer is stopped, the block copolymer becomes "frozen" in its shape and forms the stabilizing network structure of the blend.

It is known that many fluids from oils to molten polymers, when loaded with suspended particulates will exhibit rheological behavior comparable to that exhibited by the cited block copolymer. FIG. 1 is a graph showing the Non Newtonian rheological behavior of a silicone oil, such as Dow Corning 200, a polydimethyl siloxane manufactured by Dow Corning of Midland, Michigan loaded with various amounts of carbon black, such as Vulcan XC 72 manufactured by Cabot Corporation of Boston, Massachusetts as compared with Kraton G 1651 Rubber, manufactured by Shell Chemical Company of Houston, Texas at a temperature of 40° C. Kraton G 1651 rubber is a typical block copolymer exhibiting Non-Newtonian rheological behavior similar to that disclosed by Gergen et al for the structure stabilizing component of the interpenetrating polymer network. As shown in FIG. 1 the dynamic viscosity "$\eta^*$" of the particulate loaded silicon oil decreases as a function of shearing frequency "$\omega$" (which is directly related to rate of shear) in contrast to the rheological behavior of pure silicon oil (0%) which at low shearing frequencies exhibits Newtonian behavior where the viscosity is a constant independant of the shearing frequency. The Newtonian behavior of the silicon oil at low shearing frequencies is typical of pure polymer melts as reported by J. L. White in his article "Rheological Behavior of Highly Filled/Reinforced Polymer Melts" incorporated herein by reference.

The rheological behavior of silicon oil loaded with carbon black between 30% and 40% by weight as illustrated in FIG. 1 has approximately the same rheological behavior as Kraton G 1651. Similar changes in the rheological behavior of molten polymers having Newtonian behavior have been reported by others in addition to those discussed in the articles by Ziegebaur and Caruthers and J. L. White. The viscosity of these particulate loaded polymers can be adjusted to more closely match the rheological properties of the thermoplastic resin with which it is mixed by controlling the quantity and/or size of the particulate dispersed therein. This allows a much broader application of the thermoplastic interpenetrating polymer network (TIPN) concepts since a copolymer such as disclosed by Gergen et al is no longer required.

The idealistic three dimensional model of a thermoplastic interpenetrating polymer network for a two phase polymer blend is illustrated in FIG. 2. In this model the structure stabilizing constituent is a particulate loaded polymer such as the carbon black loaded silicone oil discussed above, ethylene vinyl acetate or polystyrene as discussed by J. L. White is identified as Phase A and the engineering thermoplastic resin is identified as Phase B. The Phase A polymer may be selected from any suitable polymer having Newtonian behavior at low shearing frequencies which when loaded with an appropriate particulate exhibits the prerequisite Non-Newtonian rheological properties. The Phase B resin may be selected from any engineering thermoplastic polymer or copolymer as identified by Gergen et al in U.S. Pat. No. 4,088,626. These include polyolefins, thermoplastic polyesters, polyamides, polycarbonates, acetal resins, thermoplastic polyurethanes halogenated thermoplastics, nitrile barrier resins, and blends of these thermoplastic polymers with viscosity modifying resins as are known in the art.

In addition to the advantages cited above, by varying the particulate loading levels as well as the nature and/or size of the particulate, better control of the rheology behavior of the loaded polymer may be achieved. It is also possible to choose the particulate to serve more than one function. For example a carbon black loaded Phase A may be used to impart high electrical or thermal conductivity to the inter-penetrating polymer network in addition to acting as the structure stabilizing component. A comparison between the experimentally determined electrical conductivity of ethylene vinyl acetate (EVA) loaded with carbon black and the electrical conductivity computed for an interpenetrating polymer network (IPN) with Phase A consisting of ethylene vinyl acetate loaded with the same amount of carbon black is shown in FIG. 3. The dramatic increase in conductivity is due to the exponential increase in conductivity resulting from the concentration of carbon black in only one of the continuous interpenetrating network phases. In this computation, the model of FIG. 2 for the structure of the interpenetrating network was assumed to be valid and Phase B was an insulator.

As previously indicated, the thermoplastic interpenetrating polymer network is made by first mixing the selected polymer with a predetermined quantity of particulate to form a structure stabilizing Phase A polymer having the desired Non Newtonian rheological behavior. In particular the quantity of particulate added to the polymer is selected to produce a viscosity matching the viscosity of the engineering thermoplastic resin with which it is to be blended at the blending temperature and the blending shear stress rate. The blending temperature is selected to be above the melting temperature of Phase A or B whichever has the highest melting temperature.

Since the better the interdispersion of Phase A and Phase B in the blending process, the better the chance for the formation of co-continuous interlocking networks of the Phase A polymer and Phase B resin, the ratio between the Phase A and Phase B viscosities at the blending temperature and shear stress rate preferably should be in the range from 0.8 to 1.2. However it is recognized the viscosity outside of the prefered range can be blended to form the desired interpenetrating network.

The Phase A and Phase B polymers are heated to the blending temperature and shear mixed at the predetermined shear stress rate until the desired interdispersion of the two Phases is obtained. The blending is then terminated removing the shear stress. Removing the shear stress freezes the blended structure of the Phase A polymer in its stressed state due to its Non Newtonian behavior. The blend is then cooled to below the melting point of Phase B solidifying the blend with the frozen Phase A polymer constituting the structure stabilizing phase of the interpenetrating network. The other polymer due to the frozen phase A structure, must conform to this morphology.

Although the thermoplastic interpenetrating polymer network is discussed in terms of a single engineering thermoplastic resin, it is to be recognized that the blend may comprise more than one Phase B. It is also possible that the Phase B resin may likewise be a polymer exhibiting Newtonian behavior at low shearing frequencies loaded with a suitable particulate to give it a corresponding Non-Newtonian rheological behavior with both phases functioning as network structure stabilizing phases or Phase B may contain other modifiers such as a modifier to reduce friction or other physical property of the blend.

It is not intended that the invention be limited to the particular polymers and particulates discussed above. It is recognized that other polymers can be loading with particulates and be made to exhibit a Non-Newtonian rheological behavior of the type described herein within the spirit of the invention as set forth in the appended claims.

What is claimed is:

1. A thermoplastic polymer blend comprising:
   a least one dissimilar thermoplastic resin having Newtonian rheological behavior and a determinable viscosity at a blending temperature;
   at least one other polymer having Newtonian rheological behavior at low shearing frequencies loaded with a predetermined quantity of particulates, said preloaded other polymer shear stress blended with said at least one dissimilar thermoplastic resin at said blending temperature and with a predetermined shear stress to form at least partially continuous interpenetrating network with each other, said predetermined quantity of particulates selected to impart to said other polymer a Non-Newtonian rheological behavior having a viscosity approximately equal to said determinable viscosity at said blending temperature and said predetermined stress rate.

2. The thermoplastic polymer blend of claim 1 wherein the ratio of the viscosity of the dissimilar thermoplastic resin at said blending temperature to the viscosity of said other polymer loaded with said particulate at said same temperature and said predetermined stress rate is preferably between 0.8 and 1.2.

3. The thermoplastic polymer blend of claim 1 wherein said at least one dissimilar resin is only one dissimilar resin.

4. The thermoplastic polymer blend of claim 1 wherein said at least one dissimilar resin is one dissimilar resin loaded with a particulate to impart to said dissimilar resin a Non Newtonian rheological behavior.

5. The thermoplastic polymer blend of claim 1 wherein said blending temperature is a temperature higher than the highest melting temperature of said at least one dissimilar thermoplastic resin and said at least one polymer.

6. A thermoplastic polymer blend having at least one dissimilar thermoplastic resin having a determinable viscosity at a blending temperature stress blended with at least one other polymer constituent to form an interpenetrating polymer network with said at least one dissimilar thermoplastic resin characterized by said other polymer constituent comprising:
   at least one other polymer having a Newtonian rheological behavior at low shearing frequencies; and
   a predetermined quantity of a particulate loaded into said at least one other polymer to impart to said at least one other polymer a Non Newtonian rheological behavior, said at least one other polymer loaded with said particulate having a viscosity approximately equal to said determinable viscosity at said blending temperature during said stress blending.

7. The polymer blend of claim 6 wherein the ratio of said determinable viscosity and the viscosity of the particulate loaded at least one other polymer is between 0.8 and 1.2 at said blending temperature and blending stress rate.

8. The thermoplastic polymer blend of claim 6 wherein said dissimilar thermoplastic resin comprises:
   a predetermined thermoplastic polymer having Newtonian rheological behavior; and
   a predetermined quantity of a second particulate loaded into said thermoplastic polymer to impart to said thermoplastic polymer a Non-Newtonian rheological behavior exhibiting said determinable viscosity at said blending temperature.

9. A method for making a thermoplastic interpenetrating polymer network blend comprising the steps of:
   mixing a predetermined quantity of particulate with a polymer having Newtonian rheological properties at low shearing frequencies to form a dispersed phase polymer having Non-Newtonian rheological behavior,
   heating said dispersed phase polymer along with at least one dissimilar thermoplastic resin to a blending temperature;
   blending said dispersed phase polymer with said dissimilar thermoplastic resin in a shear blender at a predetermined shear rate to produce at least partial continuous interlocked networks between said dispersed phased polymer and said dissimilar thermoplastic resin; and
   terminating said blending to freeze said dispersed phase polymer in said interlocked network to form said thermoplastic interpenetrating polymer network blend with said dispersed phase polymer being the structure stabilizing phase.

10. The method of claim 9 wherein said step of heating includes the step of heating said dispersed phase polymer with one dissimilar thermoplastic resin to said blending temperature.

11. The method of claim 9 wherein said step of heating includes the step of heating said dispersed phase polymer with at least two dissimilar thermoplastic resins.

12. The method of claim 10 wherein said method further includes the step of premixing said dissimilar thermoplastic resin with at least one viscosity modifier to change the viscosity of said thermoplastic resin to be approximately equal to said predetermined viscosity.

13. The method of claim 10 wherein said method further includes the step of premixing said dissimilar thermoplastic resin with at least one viscosity modifier to change the viscosity of said dissimilar thermoplastic resin and reduce the ratio between the viscosity of the dissimilar thermoplastic resin and the predetermined viscosity to the range between 0.8 and 1.2.

14. The method of claim 9 wherein said step of mixing includes the step of mixing said predetermined quantity of particulates to cause said predetermined viscosity to be approximately equal to the viscosity of said dissimilar thermoplastic resin at said blending temperature and said blending stress rate.

15. The method of claim 9 wherein said step of mixing includes the step of mixing said predetermined quantity of particulates to cause the ratio of said predetermined viscosity to the viscosity of said dissimilar thermoplastic resin to be between 0.8 and 1.2 at said blending temperature and said blending shear stress rate.

16. The method of claim 9 wherein said method further includes the step of mixing a particulate with at least one of said dissimilar thermoplastic resins to form a dispersed phase resin having Non Newtonian rheological behavior having a viscosity approximately equal to said predetermined viscosity at said blending temperature.

* * * * *